May 21, 1963     K. SCHWARTZWALDER ET AL     3,090,094
METHOD OF MAKING POROUS CERAMIC ARTICLES
Filed Feb. 21, 1961
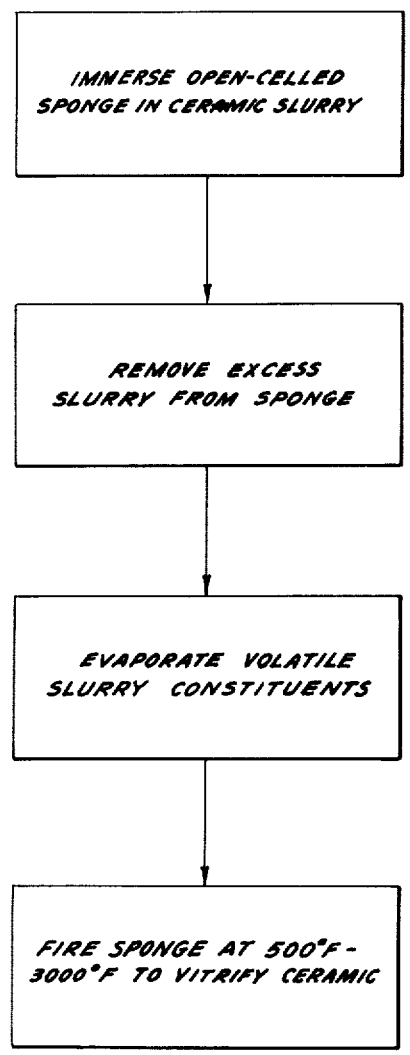
INVENTORS
Karl Schwartzwalder &
BY Arthur V. Somers
ATTORNEY

3,090,094
METHOD OF MAKING POROUS CERAMIC ARTICLES

Karl Schwartzwalder, Holly, and Arthur V. Somers, Flushing, Mich., assignors to General Motors Corporation, Detroit, Mich., a corporation of Delaware
Filed Feb. 21, 1961, Ser. No. 90,619
8 Claims. (Cl. 25—156)

This invention relates to an improved method for manufacturing open-celled, porous ceramic structures which are useful as heat-resistant filters for molten metal, as heat-resistant catalyst supports and in other applications. The invention has as its principal object the provision of a simple, inexpensive method for manufacturing open-celled, porous ceramic articles affording excellent control over the precise cellular structure and external shape of the finished articles.

Cellular ceramic articles are produced in accordance with the present invention by immersing an open-celled porous element of pliable synthetic or natural organic material in a slurry of finely-divided ceramic powder plus ceramic binder so as to uniformly coat the inner cell-defining walls of the element with a thin layer of the slurry. After the excess slurry is removed from the ceramic-coated porous element, the latter is fired to completely vaporize and burn out the organic material and, if desired, to vitrify the ceramic. In this manner the precise shape and internal structure of the original porous element may be reproduced in hard, self-sustaining ceramic. The principal steps in the process of this invention are illustrated in the accompanying flow sheet.

Various ceramic materials, including zirconia, zircon, petalite, mullite, talc, silica and alumina, may be used in practicing this invention. The binder in the slurry is important to eliminate the danger of the ceramic article's collapsing during or after removal of the organic material and before the ceramic has vitrified. Clay and sodium silicate are examples of suitable binders, and we have found that a cement binder consisting of calcium aluminate and either phosphoric acid or sodium silicate produces superior results. The constituents of the cement can be mixed together before addition to the slurry, or they may be added separately.

In some instances it is desirable to include a flux in the slurry to reduce the vitrification temperature and improve the physical properties of the finished ceramic article. Generally, however, fluxes are not essential because the binder material itself will serve as a flux during vitrification of the ceramic. Silica and the alkaline earth oxides and silicates are typical fluxes and are of particular utility in combination with alumina.

If the porous ceramic article being manufactured is intended as a catalyst support, the ceramic may include any of the well-known catalytic oxides, such as chromium oxide, nickel oxide, copper oxide or vanadium pentoxide, which are useful as hydrocarbon oxidation catalysts for engine exhaust gas catalytic afterburners and the like. The catalyst may be mixed in the cement or it may be subsequently added as an aqueous slurry to the porous ceramic article after the firing operation. In that event, the treated article should be subsequently heated to evaporate the water. Platinum also is a useful catalyst. The porous ceramic part can be dipped into a platinum chloride solution, the liquid then being evaporated by the application of heat.

While a number of commercially available open-cell, organic sponge materials, such as cellulose sponge or poyvinyl chloride foam, may be used to practice the invention, we have found that polyurethane foam is greatly preferred. This latter material is available commercially in a large variety of open cell sizes ranging from a structure having extremey small cells, which is desirable for the manufacture of ceramic filters, to a large cell structure, which appears preferable where the ceramic article is to be used as a catalyst carrier. Such open-cell polyurethane foam materials are prepared by reacting a polyisocyanate, such as toluene diisocyanate, with a polyether or polyester containing hydroxyl groups under conditions and in proportions to provide a spongy pad having the desired percentage of open cells. A typical polyester used is the reaction product of adipic acid and ethylene glycol, while polyethylene ether glycol is an example of an appropriate polyether. A separate foaming agent, such as water, normally is employed or, in the case of a polyester, the release of carbon dioxide may accompany the reaction of the polyisocyanate with the polyester. A catalyst generally is also used to promote the reaction of the polyisocyanate with the polyester or polyether. In some instances the proportion of open cells can be beneficially increased by immersing the pad in a solution of sodium hydroxide to dissolve some of the thin walls separating the cells.

When an open-cell foam pad or sponge is used as the skeletal supporting structure in the process, a sponge having approximately 15 to 50 pores per linear inch has produced the best results. However, with such a dimensionally stable foam, the cell structure may vary to a considerable extent.

If desired, the invention may be practiced by using a flexible, porous mat formed of organic fibers, either woven or felted, instead of the cellular sponge to produce a fibrous ceramic article having the shape and structure of the mat. While the open-cell polyurethane foams produce superior results in general, a skeleton of fiber cord mesh can be conveniently employed to produce a very open, delicately constructed but sturdy ceramic structure. The fibers absorb the water from the coating cement and aid in the buildup of a uniformly thick coating. In this respect, absorbent skeletal material, such as cotton, wool, paper, sisal and other natural fibers, are superior to the non-porous and nonabsorbent synthetic fibers. With the latter materials, uniformity of coating is more dependent upon the adhesive properties of the coating slurry. Therefore, coating compositions containing calcium aluminate and either phosphoric acid or sodium silicate have proved to be particularly useful in coating nonabsorbent synthetic fibers because of the excellent adhesion characteristics of such compositions. A slurry containing clay, on the other hand, performs satisfactorily for coating highly absorbent fibers. It also should be noted that coating compositions containing calcium aluminate and phosphoric acid or sodium silicate do not readily collapse during burnout and permit greater flexibility in firing temperatures and times because the coating develops reasonable strength by means of a low-temperature reaction.

In general, the size of the powder constituents in the slurry may range from −80 mesh to −600 mesh, and we have achieved excellent results with −325 mesh powders.

Likewise, the binder content of the slurry may vary appreciably, depending on the nature of the binder and skeletal material and the mesh size of the powders present. If an extremely fine powder is used, the binder content should be increased, of course. The amount of binder need be only sufficient to prevent collapse of the ceramic structure during burnout of the organic base, or it may constitute the entire final structure. Best results usually are obtained when the binder constitutes at least 20% of the weight of the slurry. The granular ceramic or non-cement portion of the mix preferably should not exceed about 75% or 80% by weight of the slurry, although the practical maximum is that amount which still permits sufficient cement to be present to prevent collapse of the structure during burnout. Thus it will be seen that the cement or binder in the slurry actually will also function as the ceramic or refractory which constitutes the final product. Unless otherwise indicated, therefore, the term "ceramic" is used in the appended claims as encompassing this type of binder.

As hereinbefore stated, the preferred binder consists essentially of calcium aluminate with the remainder being either sodium silicate or phosphoric acid, preferably in the form of an aqueous solution. If used with commercial sodium silicate containing approximately 60% water, the amount of calcium aluminate normally should constitute about 30% to 70% of the weight of the binder. When a silicate-type binder is employed, a small amount of wetting agent may be beneficially included in the slurry or glycerin may be substituted for the water. If phosphoric acid is used, the mole ratio of aluminate to acid preferably should not be less than one. The supporting polyurethane structure usually will be destroyed prematurely if the phosphoric acid content exceeds that of calcium aluminate on a molar basis.

The slurry must be sufficiently viscous to prevent excessive drainage from the porous supporting structure after coating. Of course, its viscosity should not be so great as to restrict penetration of the slurry into the cells upon compression and expansion of the structure. The thickness of the cement coating on the supporting membranes will vary with the viscosity of the slurry as well as by its composition and amount applied.

The following specific embodiments will serve to more fully illustrate the invention:

*Example I*

We prepared an aqueous slurry composed, by weight, of about 67% of 100 mesh and finer zircon powder, 10% calcium aluminate, 15% phosphoric acid (75% $H_3PO_4$, 25% $H_2O$) and 8% additional water. A rectangular slab of open-cell polyurethane foam was immersed in this slurry and, while so immersed, was alternately compressed and permitted to expand until the slurry extended completely through the foam. This required approximately two minutes. The foam slab was then removed from the solution and the excess slurry squeezed out. Next, the slab was heated for about two hours at 200° F. to evaporate the water, and then it was fired from room temperature to approximately 2550° F. and back to room temperature over an eight-hour period. The resultant rectangular, open-celled porous ceramic article had excellent physical strength for use as a high heat-resistant filter for molten metals.

*Example II*

A composition similar to that described in Example I was prepared, except that 3% by weight of vanadium pentoxide powder having a —325 mesh size was substituted for 3% of the zircon powder. The processing procedure also was the same, but a larger celled polyurethane foam was used, and the treated slab was fired to a temperature of about 2450° F. during the eight-hour cycle. The ceramic structure thus produced was used as a catalyzer for the oxidation of unburned hydrocarbons in vehicle engine exhaust gas.

*Example III*

We prepared an aqueous slurry consisting, by weight, of about 59% milled alumina, 15% calcium aluminate, 16% phosphoric acid (75% $H_3PO_4$, 25% $H_2O$) and 10% additional water. A rectangular slab of open-cell polyurethane foam was immersed in this slurry and, while so immersed, was alternately compressed and permitted to expand to its original shape until the slurry occupied virtually all the pores in the slab. The saturated foam slab then was removed from the impregnating solution and the excess slurry squeezed out. In this manner, the walls of the cells were provided with a relatively thin coating of the slurry. The slab was next heated for about thirty minutes at a temperature of about 300° F. to remove the volatile constituents and harden the cement, after which it was fired to approximately 2100° F. over an eight-hour period. The vitrified, open-celled ceramic foam article made by this procedure possessed satisfactory strength and excellent pore structure.

Another slurry which was tested consisted, by weight, of about 10% calcium aluminate, 10% sodium silicate, 10% water and the balance an alumina base batch consisting of 94% $Al_2O_3$, 3% $SiO_2$ and 3% talc. The open-celled ceramic structure produced from this composition also proved to be satisfactory. Likewise, a slurry composed, by weight, of about 67% powdered zircon, 10% calcium aluminate, 15% phosphoric acid (75% $H_3PO_4$, 25% $H_2O$) and 8% additional water was evaluated and found to produce a useful article.

Various clays, such as bentonite, ball clay and kaolin, can be beneficially added to the above-described slurries to insure against collapse of the ceramic structure during burnout of the foam. The inclusion of approximately 10% by weight of clay in this solution aids in supporting the structure during the firing operation.

The firing temperature depends upon the particular ceramic used in the process and the temperature to which the resultant article is to be subjected. For example, porous structures formed from compositions containing considerable calcium aluminate and sodium silicate or phosphoric acid will harden at room temperature, and the firing temperature need be only high enough to burn out the organic material. Other structures, such as those in which calcium aluminate cement is used primarily as a temporary binder to permit the organic support material to be safely burned out, may need to be fired at a temperature sufficiently high to permit sintering of the ceramic materials present. Hence, the firing temperature depends on the nature of the constituents, their particle sizes, and the types and amounts of fluxes used, if any. In general, it appears that the firing temperature may vary from about 500° F. to 3000° F. If the porous ceramic article is to be used at extremely high temperatures, the article should be vitrified by the firing operation.

Of course, the firing time is governed to a considerable extent by the maximum temperature attained. To avoid damage due to heat shock, the coated article is heated gradually to the maximum firing temperature and then cooled slowly. Excellent results have been obtained with an eight-hour firing cycle in which the article is heated from room temperature to 25000° F. over a four-hour period and gradually cooled to room temperature during the next four hours. Of course, to prevent rupture of the thin ceramic walls, it is always desirable to evaporate the liquid in the slurry before exposing the article to a very high temperature.

As hereinbefore indicated, porous ceramic structures of the type described above are useful as supports for catalysts employed in the combustion of exhaust gases. Accordingly, we have taken cylindrical speciments of polyurethane foam approximately four inches in length and two and one-half inches in diameter and coated these speciments with the cement described in Example I above. Immediately after coating, the treated foam specimens were inserted into ground but unfired sleeves having $3/16$-inch thick walls formed from a high alumina composition, such as one consisting, by weight, of about 90% alumina, 4.7% clay, 4% talc and 1.3% strontium carbonate. The inner diameters of these sleeves were slightly smaller than the diameters of the coated foam cylinders. Next, the coated polyurethane foam inserts were permitted to harden within the sleeve, and the assemblies were fired at temperatures ranging from approximately 2550° F. to 2950° F. The finished products were then assembled in exhaust systems of automobiles.

In another application, coated foam slabs nine inches square and one inch thick were each sandwiched between two ⅛-inch thick mesh fiber cord sheets coated with a cement composed, by weight of about 66% zircon powder, 10% calcium aluminate, 15% phosphoric acid (75% H₃PO₄, 25% H₂O) and 8% additional water. After assembly, the units were placed upon flat steel plates, weighted to insure intimate contact between the parts and to prevent warpage, and hardened by heating for two hours at a temperature of 200° F. These assemblies then were fired to about 2550° F. in eight hours to vitrify the ceramic. During the firing cycle, the assemblies were positioned on flat plates which had been coated with thin layers of boralon powder to prevent development of shrinkage cracks. The resultant products were used as filters for molten aluminum.

The open-celled porous ceramic structures produced by the above-described process contain an appreciably higher percentage of voids than do porous ceramic articles manufactured by other methods. For example, in the past an organic filler has been mixed with a ceramic powder and the resultant article fired to burn out the filler. Since a very large amount of filler is required in order to produce interconnected cells by this method, the article either is very weak or has a high percentage of closed cells.

While our invention has been described by means of certain specific examples, it is to be understood that its scope is not to be limited thereby except as defined by the following claims.

We claim:

1. A method of making an open-celled, porous ceramic article which comprises immersing an open-celled element of spongy material in a slurry containing a ceramic coating material to coat cell-defining walls of said element, removing excess slurrry from said element, and firing said element to remove the spongy material and form a hardened structure of porous ceramic.

2. A method of making an open-celled, porous ceramic article which comprises immersing an open-celled element of spongy material in a slurry containing ceramic powder and binder to coat cell-defining walls of said element, removing excess slurry from the ceramic-coated element thus produced, and heating said element at a temperature and for a time sufficient to remove the spongy material and harden said binder.

3. A method of making an open-celled, porous ceramic article which comprises immersing an open-celled, spongy pad in a slurry containing a ceramic coating material, retaining said pad in said slurry for a period of time sufficient to coat cell-defining walls of said pad, removing excess slurry from the resultant ceramic-coated element, and firing said element at a temperature of about 500° F. to 3000° F. to remove the organic material and form a solidified structure of porous ceramic.

4. A method of making an open-celled, porous ceramic article which comprises immersing an open-celled, flexible element of organic material in a slurry containing ceramic binder and at least one finely-divided ceramic powder selected from the group consisting of zirconia, zircon, petalite, mullite, talc, silica and alumina, retaining said element in said slurry for a period of time sufficient to coat cell-defining walls of said element, removing excess slurry from the ceramic-coated, porous element thus produced, and firing said element to remove the organic material, vitrify the ceramic and produce a hard, self-sustaining, open-celled ceramic article having the shape and internal structure of the original pliable element.

5. A method of making an open-celled, porous ceramic article which comprises immersing an open-cell polyurethane foam element in a slurrry containing a ceramic coating material to cause cell-defining walls of said element to become coated with said slurry, removing excess slurry from the ceramic-coated element, and thereafter firing said element at a temperature sufficient to burn out the polyurethane and form a hardened structure of porous ceramic.

6. A method of making an open-cell, porous ceramic article which comprises immersing an open-cell polyurethane foam pad in an aqueous slurry containing finely-divided ceramic powder and ceramic binder, flexing said pad while in said slurry to coat inner, cell-defining walls of said element, squeezing out excess slurry from the resultant ceramic-coated pad, and thereafter firing said pad at a temperature of about 500° F. to 3000° F. to burn out the polyurethane to thereby produce a hard, self-sustaining, open-celled ceramic article having the shape and internal structure of the original polyurethane foam pad.

7. A method of making an open-celled, porous ceramic article which comprises immersing an open-celled, porous element of flexible, organic material in a slurry consisting essentially of about 20% to 80% by weight of ceramic powder and 20% to 80% by weight of ceramic binder, retaining said element in said slurry for a period of time sufficient to coat cell-defining walls of said element, removing excess slurry from said element, and thereafter firing said element at a temperature of about 500° F. to 3000° F. for a period of time sufficient to remove the organic material and vitrify the ceramic.

8. A method of making an open-celled, porous ceramic article which comprises immersing an open-cell polyurethane foam pad in a slurry consisting essentially of about 20% to 75% by weight of finely-divided ceramic powder, 20% to 75% by weight of a binder composed of approximately 30% to 70% by weight of calcium aluminate and 30% to 70% by weight of a member selected from the group consisting of phosphoric acid and sodium silicate, and the balance substantially all water, retaining said pad in said slurry for a period of time sufficient to coat the inner, cell-defining walls of said pad, compressing said pad to remove excess slurry therefrom, heating said pad to evaporate volatile constituents in said slurry, and thereafter firing said coated pad at a temperature of about 500° F. to 3000° F. for a period of time sufficient to burn out the polyurethane and vitrify the ceramic to thereby produce a hard, self-sustaining, open-celled ceramic article having the shape and internal structure of the original porous element.

References Cited in the file of this patent

UNITED STATES PATENTS

| | | |
|---|---|---|
| 1,938,170 | Bellamy | Dec. 5, 1933 |
| 2,751,289 | Elliot | June 19, 1956 |
| 2,921,357 | Fujil et al. | Jan. 19, 1960 |
| 2,977,265 | Frosberg et al. | Mar. 28, 1961 |

UNITED STATES PATENT OFFICE
CERTIFICATE OF CORRECTION

Patent No. 3,090,094            May 21, 1963

Karl Schwartzwalder et al.

It is hereby certified that error appears in the above numbered patent requiring correction and that the said Letters Patent should read as corrected below.

Column 1, line 69, for "poyvinyl" read -- polyvinyl --; column 2, line 1, for "extremey" read -- extremely --; column 4, line 49, for "25000° F." read -- 2500° F. --; lines 58 and 61, for "speciments", each occurrence, read -- specimens --.

Signed and sealed this 31st day of December 1963.

(SEAL)
Attest:
ERNEST W. SWIDER

Attesting Officer

EDWIN L. REYNOLDS

Acting Commissioner of Patents